No. 885,845. PATENTED APR. 28, 1908.
R. G. HANDY.
VEHICLE SUSPENSION.
APPLICATION FILED DEC. 17, 1906.

2 SHEETS—SHEET 1.

WITNESSES:
Oliver E. Barthel
Anna M. Dow

Robert G. Handy
INVENTOR.
BY 
ATTORNEYS

No. 885,845. PATENTED APR. 28, 1908.
R. G. HANDY.
VEHICLE SUSPENSION.
APPLICATION FILED DEC. 17, 1906.

2 SHEETS—SHEET 2.

WITNESSES:
Oliver C. Barthel
Anna M. Dorr

Robert G. Handy
INVENTOR.
BY 
ATTORNEYS

UNITED STATES PATENT OFFICE.

ROBERT G. HANDY, OF BAY CITY, MICHIGAN.

VEHICLE SUSPENSION.

No. 885,845.  Specification of Letters Patent.  Patented April 28, 1908.

Application filed December 17, 1906. Serial No. 348,129.

*To all whom it may concern:*

Be it known that I, ROBERT G. HANDY, a citizen of the United States of America, residing at Bay City, in the county of Bay and State of Michigan, have invented certain new and useful Improvements in Vehicle Suspension, of which the following is a specification, reference being had therein to the accompanying drawings.

This invention relates to new and useful improvements in vehicles and more especially to the means for supporting the body upon the running gear.

The objects of the invention are to reduce the transmission of the shocks and vibrations of the running gear to the body of the vehicle and to always maintain the body of the vehicle in a substantially horizontal plane irrespective of the tilting of the axle or running gear due to inequalities of the road.

To this end the invention consists in interposing between the spring supports for the body and the running gear of the vehicle, a system of levers so arranged as to change or modify the deflection or vibration of the axles to which they are attached, in transmitting the same to the springs which are supported by said levers.

Figure 1:
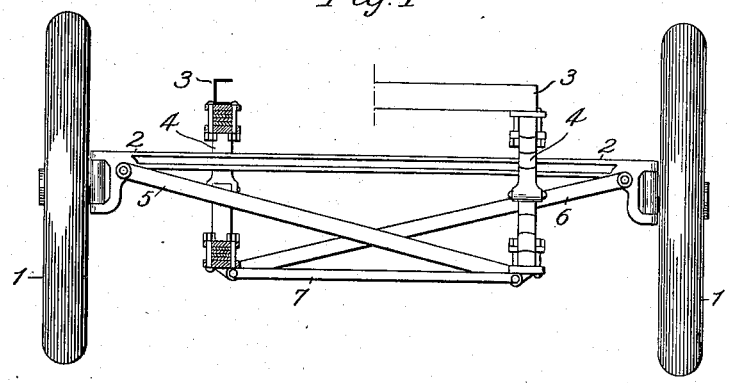
Figure 2:
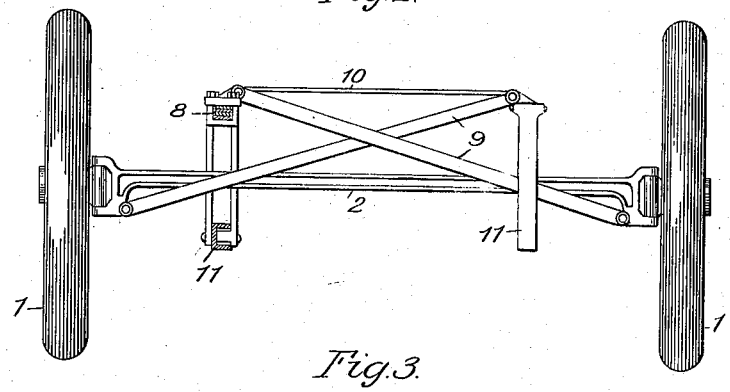
Figure 3:
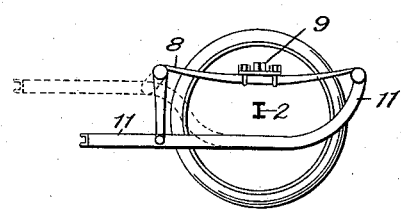
Figure 3:
Figure 4:
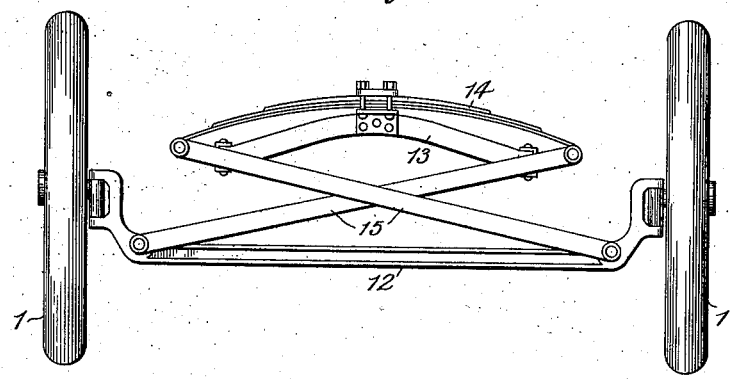
Figure 5:
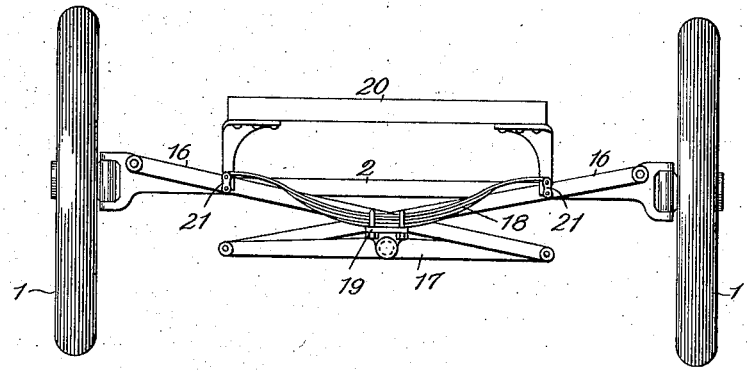
Figure 6:
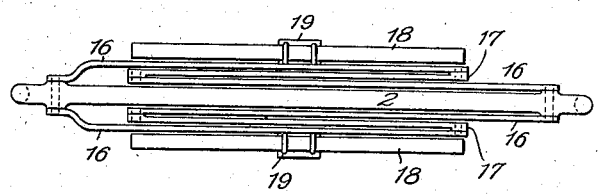
Figure 6:
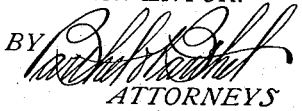

The invention further consists in the particular construction and arrangement of said levers and parts, all as hereinafter more fully described, reference being had to the accompanying drawings in which Figure 1 is a front end elevation, partly in section, of a portion of the running gear of a motor vehicle embodying the invention; Fig. 2 a similar view of a modified construction; Fig. 3 a detail showing a side elevation of Fig. 2, drawn to a smaller scale; Figs. 4 and 5 are end elevations of other modified constructions; and Fig. 6 is a partial plan view of Fig. 5 showing the axle, levers and springs.

As shown in Fig. 1 of the drawings 1, 1 represent the front wheels of a motor vehicle pivotally attached to the ends of the axle 2 in the usual manner and 3 represents the body supporting frame secured to and supported solely upon the ordinary form of elliptic springs 4. These springs instead of being secured at their lower side to the axle as in the usual construction are supported with the axle extending through the springs, their upper half extending some distance above and their lower half some distance below the axle.

To support the spring and pivotally attach the same to the axle, connecting bars 5 and 6 are pivotally attached at one end to the axle near its opposite ends, the bars being each extended through the spring which is adjacent to its point of attachment to the axle and pivotally attached at its opposite end to the lower side of the other spring. A cross connecting bar or strut 7 is pivotally secured at its ends between the ends of the connecting bars, thus limiting the downward movement of said bars, and forming therewith a hanging support for the springs.

The connecting bars 5 and 6 being connected to opposite ends of the strut 7 with crossed lower ends and these ends forming the supports for the springs, the support for one spring, or the lower end of one connecting bar, can not be moved downward by the load without a corresponding upward movement of the lower end of the other bar or support, and as the load exerts at all times a vertical downward force, no such movement of one support will be caused by the load when the axle is in a horizontal position, as the angle between each bar and the strut is the same and each supports an equal portion of the load. But when one wheel is raised or lowered by passing over an obstruction or depression in the road and the axle correspondingly raised or lowered at one end, the angle between the strut and the connecting bar attached to this end of the axle, will be increased or decreased, thus increasing or decreasing its power to lift the load. At the same time the angle between the strut and the other connecting bar will be inversely increased or decreased and thus the spring near the raised end of the axle will be lowered owing to the decreased action of its connecting bar, and the spring near the opposite end of the axle will be raised by its connecting bar an equal amount, thus maintaining the body of the vehicle in a substantially horizontal plane. The vertical movement and other vibrations of the axle as well, are thus modified and decreased by the connecting bars in being transmitted to the springs which are free to operate in the usual manner to absorb the vibrations and thus the tipping of the body, all jolts and jars incident to passing over obstructions or rough roads, or from other sources, are practically all eliminated before reaching the body of the vehicle, thus making a very smooth, easy riding car.

In the construction shown in Figs. 2 and 3 half-elliptic springs 8 are used which are supported above the axle upon the upper ends of the connecting bars 9 which are similar to the bars 5 and 6 except that they extend upward from the axle with crossed upper ends. The springs are connected by a strut 10 and are pivotally attached at their ends to the body supporting frame 11 which is curved to extend beneath the axle between the points of attachment of the springs thereto.

Fig. 4 shows a construction in which a drop axle 12 is used and the body frame 13 is secured to the middle of a spring 14 pivotally attached to the upper crossed ends of the connecting bars 15 which are pivotally attached at their opposite ends to the axle. In this construction the spring serves as the strut or connection between the upper crossed ends of the connecting bars.

In the construction shown in Figs. 5 and 6 the connecting bars 16 are arranged similarly to those in Fig. 1, being pivotally attached at one end to the axle and extending downward therefrom and connected at their crossed lower ends by a strut 17. Two sets of these bars and struts are provided, one at each side of the axle and two half-springs 18 are preferably used, said springs being pivotally secured intermediate their ends to the middle of the struts by clips 19 and connected to the body frame 20 at their ends by means of links 21.

All of these different constructions operate substantially in the same manner and other forms may be devised, but all embody the elements of supporting or connecting bars each attached at one end to the axle and its opposite end to the load supporting member and a member connecting the ends of the bars. By this system of leverage the shock transmitted to the body is reduced as well as maintaining the body in a substantially horizontal plane.

My device may be used as well on the rear axle as the front axle and I do not wish to limit myself to the constructions shown but desire to protect the principle of having the wheel ends of the axles act as the moving end of a lever, the load support being at the practically stationary fulcrum end of the lever, whereby the inequalities of the road move the wheels but do not materially change their load.

Having thus fully described my invention what I claim is:—

1. In a motor vehicle, the combination with an axle, a body supporting frame, a strut substantially parallel to the axle and a spring yielding means supporting the frame on a strut, of a pair of obliquely crossed, independent bars in a plane substantially parallel to the axle, each articulating an end of the strut to the remote end of the axle.

2. In a motor vehicle, the combination with an axle, and a body supporting frame, of elliptic springs secured to the body frame at their upper side and extending below the axle, bars pivoted at one end to the axle near the ends thereof and each pivotally attached to the lower side of one of said springs and a strut or bar connecting the lower sides of the springs.

3. In a motor vehicle, the combination with an axle, and a body supporting frame, of elliptic springs secured to the body frame at their upper side and extending below the axle, bars pivoted at one end to the axle near the free ends thereof and each extending inward through the adjacent spring and pivotally attached to the lower side of the opposite spring and a strut or bar connecting the lower sides of the springs.

In testimony whereof I affix my signature in presence of two witnesses.

ROBERT G. HANDY.

Witnesses:
 OTTO F. BARTHEL,
 OLIVER E. BARTHEL.